US012066778B2

(12) United States Patent
Tashiro

(10) Patent No.: US 12,066,778 B2
(45) Date of Patent: Aug. 20, 2024

(54) IMAGE FORMING APPARATUS AND CONTROL METHOD

(71) Applicant: Konica Minolta, Inc., Tokyo (JP)

(72) Inventor: Shigeru Tashiro, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/326,490

(22) Filed: May 31, 2023

(65) Prior Publication Data

US 2023/0408958 A1 Dec. 21, 2023

(30) Foreign Application Priority Data

Jun. 21, 2022 (JP) ................................ 2022-099442

(51) Int. Cl.
*G03G 15/20* (2006.01)

(52) U.S. Cl.
CPC ....... *G03G 15/2039* (2013.01); *G03G 15/205* (2013.01)

(58) Field of Classification Search
CPC ......................... G03G 15/2039; G03G 15/205
See application file for complete search history.

(56) References Cited

U.S. PATENT DOCUMENTS

2012/0069358 A1* 3/2012 Nakajima .......... G03G 15/2039 358/1.9
2016/0004195 A1* 1/2016 Ozawa .............. G06K 15/1867 399/69
2022/0334527 A1* 10/2022 Maruyama ......... G03G 15/2042

FOREIGN PATENT DOCUMENTS

JP 2011-186131 A 9/2011

* cited by examiner

*Primary Examiner* — Joseph S Wong
(74) *Attorney, Agent, or Firm* — Lucas & Mercanti, LLP

(57) ABSTRACT

An image forming apparatus includes: a fixing device that thermally fixes an image based on a print job onto a sheet; and a hardware processor that changes a set temperature of the fixing device depending on a type of a printer driver that has generated the print job.

6 Claims, 9 Drawing Sheets

72

| PRINTER DRIVER | IMAGE QUALITY MODE | EDGE CORRECTION | SET TEMPERATURE (°C) | |
|---|---|---|---|---|
| | | | PLAIN PAPER | CARDBOARD |
| PCL | NORMAL MODE | OFF | 165 | 170 |
| | | ON | 160 | 165 |
| PS | NORMAL MODE | OFF | 167 | 172 |
| | | ON | 162 | 167 |
| | DESIGNER MODE | OFF | 170 | 175 |
| | | ON | 165 | 170 |

72

| PRINTER DRIVER | IMAGE QUALITY MODE | EDGE CORRECTION | SET TEMPERATURE (°C) | |
|---|---|---|---|---|
| | | | PLAIN PAPER | CARDBOARD |
| PCL | NORMAL MODE | OFF | 165 | 170 |
| | | ON | 160 | 165 |
| PS | NORMAL MODE | OFF | 167 | 172 |
| | | ON | 162 | 167 |
| | DESIGNER MODE | OFF | 170 | 175 |
| | | ON | 165 | 170 |

IMAGE FORMING APPARATUS AND CONTROL METHOD

The entire disclosure of Japanese patent Application No. 2022-099442, filed on Jun. 21, 2022, is incorporated herein by reference in its entirety.

BACKGROUND

Technological Field

The present disclosure relates to an image forming apparatus and a control method.

Description of the Related Art

Conventionally, there has been known an image forming apparatus that thermally fixes a toner image based on a print job received from a client terminal onto a sheet. A heating device is required to thermally fix the toner image onto the sheet. Therefore, a technique of suppressing energy consumed to thermally fix a toner image onto a sheet has been developed. For example, Japanese Patent Application Laid-Open No. 2011-186131 (JP 2011-A) discloses a technique of performing fixing at a temperature depending on a difference in the type of dither used for drawing images.

The technique disclosed in JP 2011-186131 A focuses on the difference in the type of dither, and does not focus on the amount of toner (hereinafter, referred to as "amount of toner applied") applied on a sheet. In order to suppress the energy consumed to thermally fix the toner image onto the sheet, it is conceivable to detect the maximum amount of toner applied and set a fixing temperature in such a manner that a fixing failure does not occur even with the detected maximum amount of toner applied. However, in this case, it takes time to perform image processing of detecting the maximum amount of toner applied, and the productivity decreases accordingly.

SUMMARY

The present disclosure has been made in view of the above background, and an object of the present disclosure is to provide an image forming apparatus and a control method capable of suppressing the occurrence of a fixing failure while suppressing a decrease in productivity.

To achieve the abovementioned object, according to an aspect of the present invention, an image forming apparatus reflecting one aspect of the present invention comprises: a fixing device that thermally fixes an image based on a print job onto a sheet; and a hardware processor that changes a set temperature of the fixing device depending on a type of a printer driver that has generated the print job.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
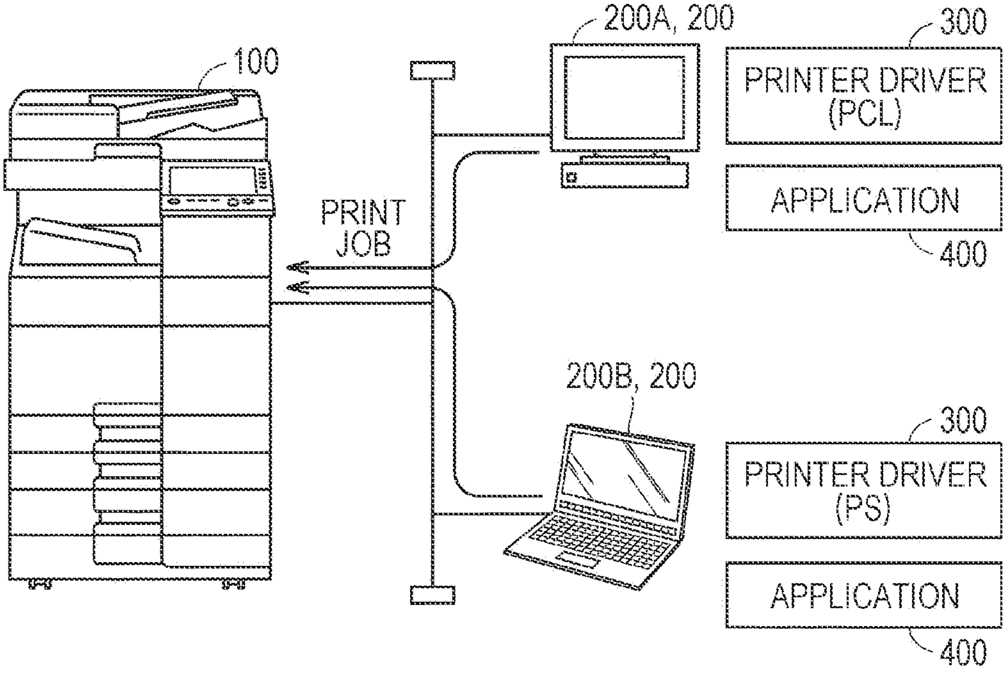
FIG. 1 is a diagram illustrating an example of a configuration of a system to which an image forming apparatus according to the present embodiment is applied.

Hereinafter, one or more embodiments and modifications of the present invention will be described with reference to the drawings. However, the scope of the invention is not limited to the disclosed embodiments. In the following description, the same parts and components are denoted by the same reference numerals. This holds true for names and functions. Therefore, detailed descriptions thereof will not be repeated. Note that the embodiments and modifications described below may be selectively combined as appropriate.

(A. System Configuration)

FIG. 1 is a diagram illustrating an example of a configuration of a system to which an image forming apparatus according to the present embodiment is applied. The system includes an image forming apparatus 100 and a client terminal 200. In the example illustrated in FIG. 1, the system includes two client terminals 200A and 200B. The configuration is an example, and the configuration of the present system is not limited thereto. In one aspect, the system may include any number of image forming apparatuses 100 and any number of client terminals.

The client terminal 200 is any device such as a personal computer (PC), a tablet, or a smartphone used by a user. Various types of applications 400 are installed in the client terminal 200. The application 400 includes, for example, spreadsheet software, image editing software, and the like.

In addition, a printer driver 300 for transmitting a print job to the image forming apparatus 100 is installed in the client terminal 200. The user installs one or more desired printer drivers 300 among a plurality of types of printer drivers in the client terminal 200.

Examples of the type of the printer driver 300 include a postscript (PS) printer driver, a printer control language (PCL) printer driver, and the like. The PS printer driver is suitable for printing from an application compatible with postscript used for graphics and desktop publishing (DTP). The PCL printer driver is suitable for printing from an application that creates common business documents. In the example illustrated in FIG. 1, the PCL printer driver is installed in the client terminal 200A, and the PS printer driver is installed in the client terminal 200B. Note that both the PCL printer driver and the PS printer driver may be installed in each of the client terminals 200A and 200B.

The printer driver 300 receives an operation from the user and generates a print job including image data indicating an image to be printed. The print job generated by the printer driver 300 is transmitted to the image forming apparatus 100. Driver type information indicating the type (PS, PCL, or the like) of the printer driver 300 that has generated the print job and condition information indicating printing conditions are added to the print job.

The image forming apparatus 100 performs printing processing based on the print job received from the client terminal 200.

(B. Hardware Configuration of Image Forming Apparatus)

Figure 2:
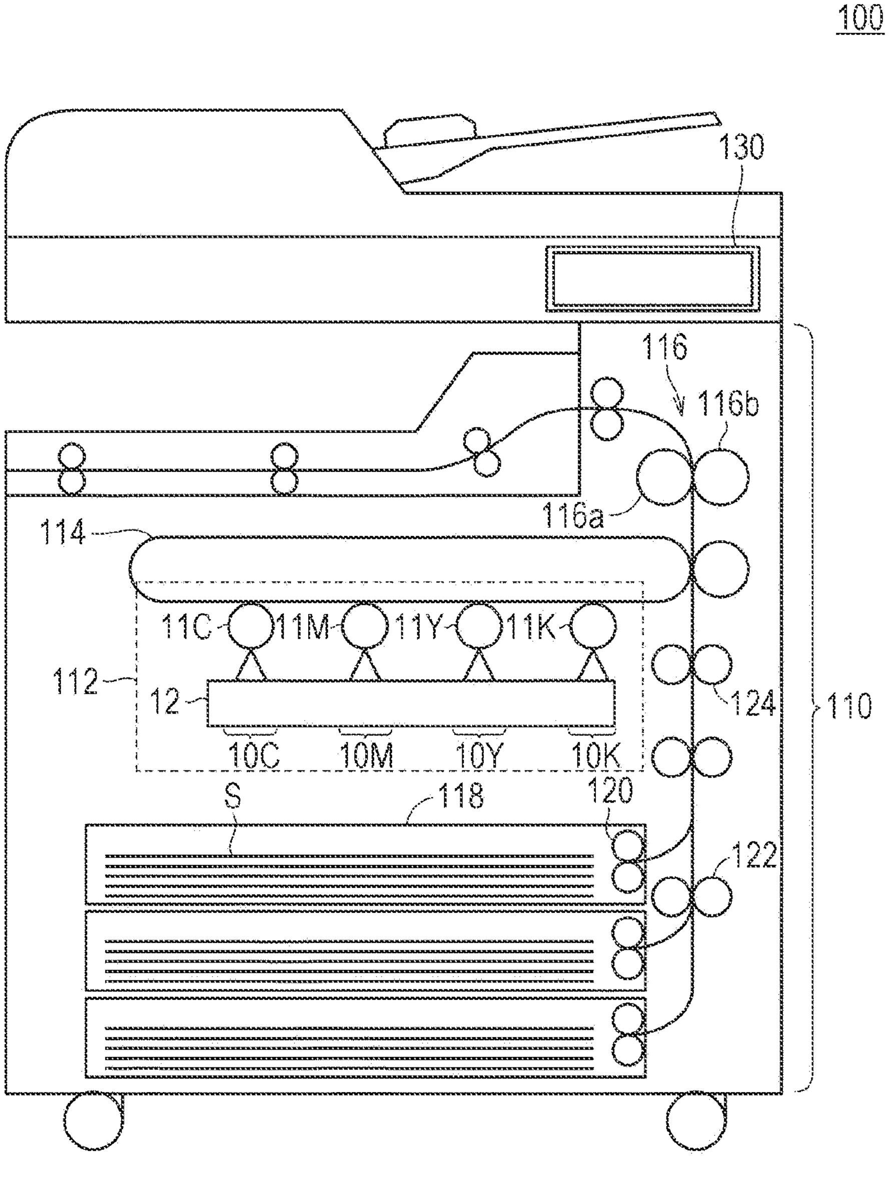
FIG. 2 is a diagram illustrating an example of the image forming apparatus according to the present embodiment.

FIG. 2 is a diagram illustrating an example of the image forming apparatus according to the present embodiment. As illustrated in FIG. 2, the image forming apparatus 100 includes a print engine 110 and an operation panel 130.

The print engine 110 includes a monochrome print mode and a color print mode. In a case where the monochrome print mode is set, the print engine 110 performs monochrome printing. In a case where the color print mode is set, the print engine 110 performs color printing.

The print engine 110 includes an imaging unit 112, an intermediate transfer belt 114, a fixing device 116, a sheet feeder 118, a sending roller 120, a conveyance roller 122, and a registration roller 124.

The print engine 110 performs the printing processing on a sheet S in the sheet feeder 118. The sending roller 120 conveys the sheet S from the sheet feeder 118. Furthermore, the conveyance roller 122 conveys the sheet S toward the intermediate transfer belt 114.

The imaging unit 112 includes imaging units 10C, 10M, 10Y, and 10K that form toner images of cyan (C), magenta (M), yellow (Y), and key plate (K), respectively. The imaging units 10C, 10M, 10Y, and 10K include a charging unit (not illustrated), a developing unit (not illustrated), a cleaning unit (not illustrated), and an intermediate transfer body contact roller (not illustrated).

Furthermore, the imaging unit 10C includes a photoreceptor 11C. The imaging unit 10M includes a photoreceptor 11M. The imaging unit 10Y includes a photoreceptor 11Y. The imaging unit 10K includes a photoreceptor 11K. Hereinafter, the photoreceptor 11C, the photoreceptor 11M, the photoreceptor 11Y, and the photoreceptor 11K may be collectively referred to simply as "photoreceptor".

An exposure unit 12 is common to the imaging units 10C, 10M, 10Y, and 10K. In one aspect, each of the imaging units 10C, 10M, 10Y, and 10K may include an individual exposure unit 12.

The imaging unit 112 and the intermediate transfer belt 114 form a toner image to be transferred to the sheet S. The charging unit uniformly charges the surface of the photoreceptor. The exposure unit 12 exposes the surface of the photoreceptor in accordance with a designated image pattern by laser writing or the like, thereby forming an electrostatic latent image on the surface of the photoreceptor. The development unit develops the electrostatic latent image formed on the photoreceptor as a toner image. The development unit uses, for example, a two-component developer containing toner and carrier.

The toner image formed on the surface of the photoreceptor is transferred to the intermediate transfer belt 114. In the color print mode, toner images are sequentially transferred from the individual photoreceptors onto the intermediate transfer belt 114, and toner images of four colors are superimposed.

The registration roller 124 adjusts the conveyance timing of the sheet S before the intermediate transfer belt 114. The intermediate transfer belt 114 transfers the toner image onto the sheet S. The sheet S having the toner image transferred thereon is conveyed to the fixing device 116.

The fixing device 116 thermally fixes the toner image onto the sheet S. The fixing device 116 includes a heating roller 116*a* including a halogen lamp or the like that heats the sheet S and the toner image, and a pressure roller 116*b* that holds the sheet S with the heating roller 116*a* and pressurizes the sheet S. The heating roller 116*a* may generate an eddy current on the surface thereof by electromagnetic induction to heat the surface. The sheet S on which the toner image has been fixed by the fixing device 116 is discharged to a discharge tray.

The operation panel 130 includes a display unit (not illustrated) and an operation unit (not illustrated). The display unit includes a liquid crystal monitor, an organic electro luminescence (EL) monitor, or the like. The liquid crystal monitor, the organic EL monitor, or the like includes a touch sensor, and can display an operation menu and receive an input by a user's touch. The operation unit includes a plurality of buttons, and can receive an input from the user similarly to the touch panel.

Figure 3:
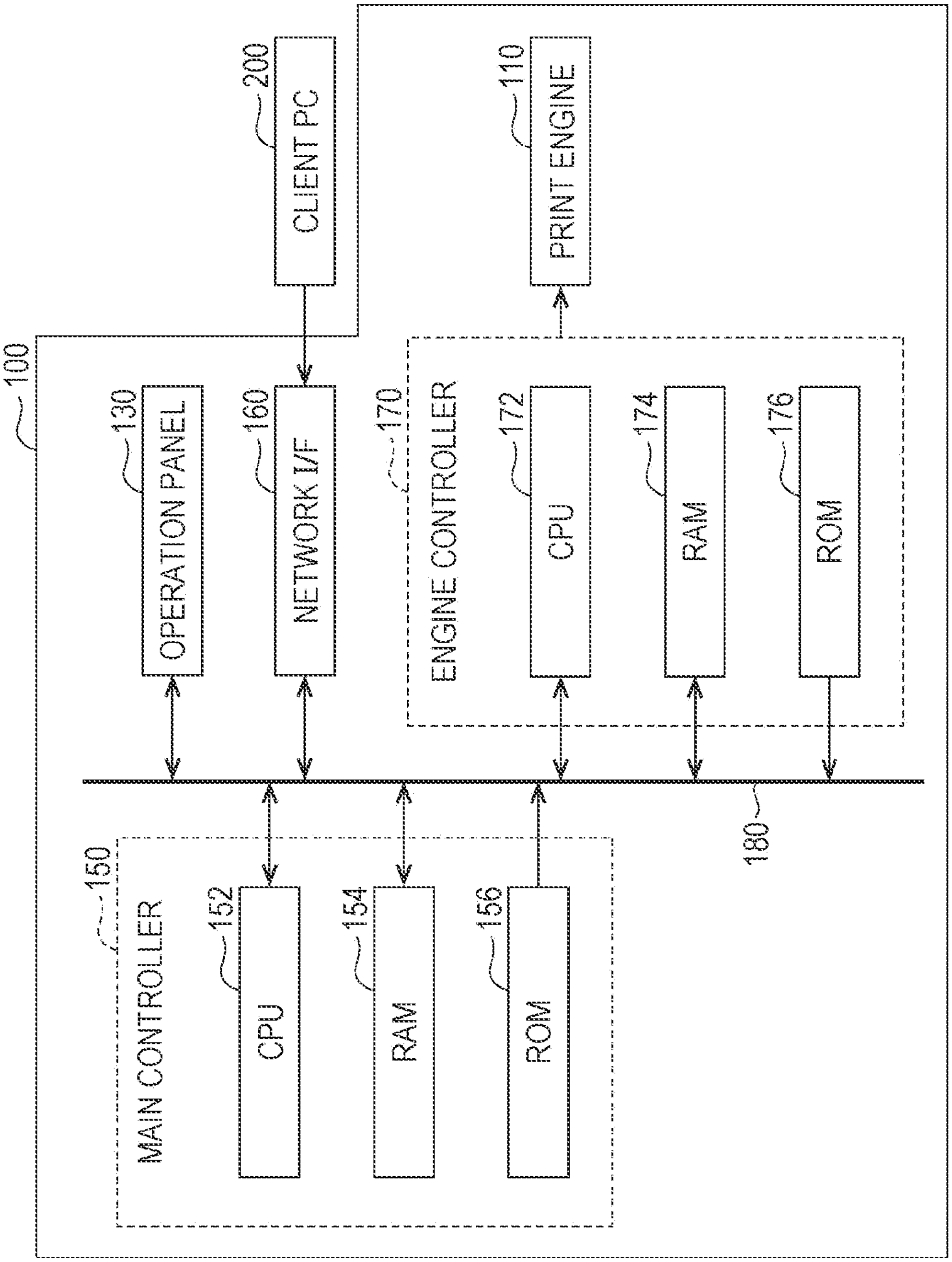
FIG. 3 is a block diagram illustrating an example of a hardware configuration of the image forming apparatus.

FIG. 3 is a block diagram illustrating an example of a hardware configuration of the image forming apparatus. The image forming apparatus 100 includes a main controller 150, a network interface 160, an engine controller 170, and a bus 180 in addition to the print engine 110 and the operation panel 130 illustrated in FIG. 2. The bus 180 mutually connects a plurality of components included in the image forming apparatus 100.

The network interface 160 is connected to an external device such as the client terminal 200 by a wired or wireless network. The network interface 160 may be implemented by, for example, a wired local area network (LAN) port, a wireless fidelity (Wi-Fi (registered trademark)) module, or the like. The image forming apparatus 100 can acquire a print job via the network interface 160. The image forming apparatus 100 may include a plurality of network interfaces 160.

The main controller 150 controls the overall operation of the image forming apparatus 100. The main controller 150 generates an image forming instruction based on the print job received via the network interface 160, and outputs the generated image forming instruction to the engine controller 170.

In response to the image forming instruction from the main controller 150, the engine controller 170 controls the print engine 110 in such a manner that an image is formed on the sheet S.

In the example of FIG. 3, the main controller 150 includes a central processing unit (CPU) 152, which is an example of a hardware processor, a random access memory (RAM) 154, and a read only memory (ROM) 156. The engine controller 170 includes a CPU 172, which is an example of a hardware processor, a RAM 174, and a ROM 176.

The CPUs 152 and 172 execute various programs stored in the ROMs 156 and 176.

The RAMs 154 and 174 temporarily store programs to be executed and data to be referred to. As the RAMs 154 and 174, for example, a static random access memory (SRAM) or a dynamic random access memory (DRAM) may be used.

The ROMs 156 and 176 are nonvolatile memories, and store various data used in the image forming apparatus 100. The ROMs 156 and 176 store a program for controlling the image forming apparatus 100 and the like. As the ROMs 156 and 176, for example, an erasable programmable ROM (EPROM), an electrically erasable programmable ROM (EEPROM), or a flash memory may be used.

The main controller 150 may be configured by at least one embedded CPU, at least one application specific integrated circuit (ASIC), at least one field programmable gate array (FPGA), or the like. Alternatively, the main controller 150 may be configured by a combination of two or more of them. Similarly, the engine controller 170 may be configured by at least one embedded CPU, at least one ASIC, at least one FPGA, or the like. Alternatively, the engine controller 170 may be configured by a combination of two or more of them.

(C. Functional Configuration of Image Forming Apparatus)

Figure 4:
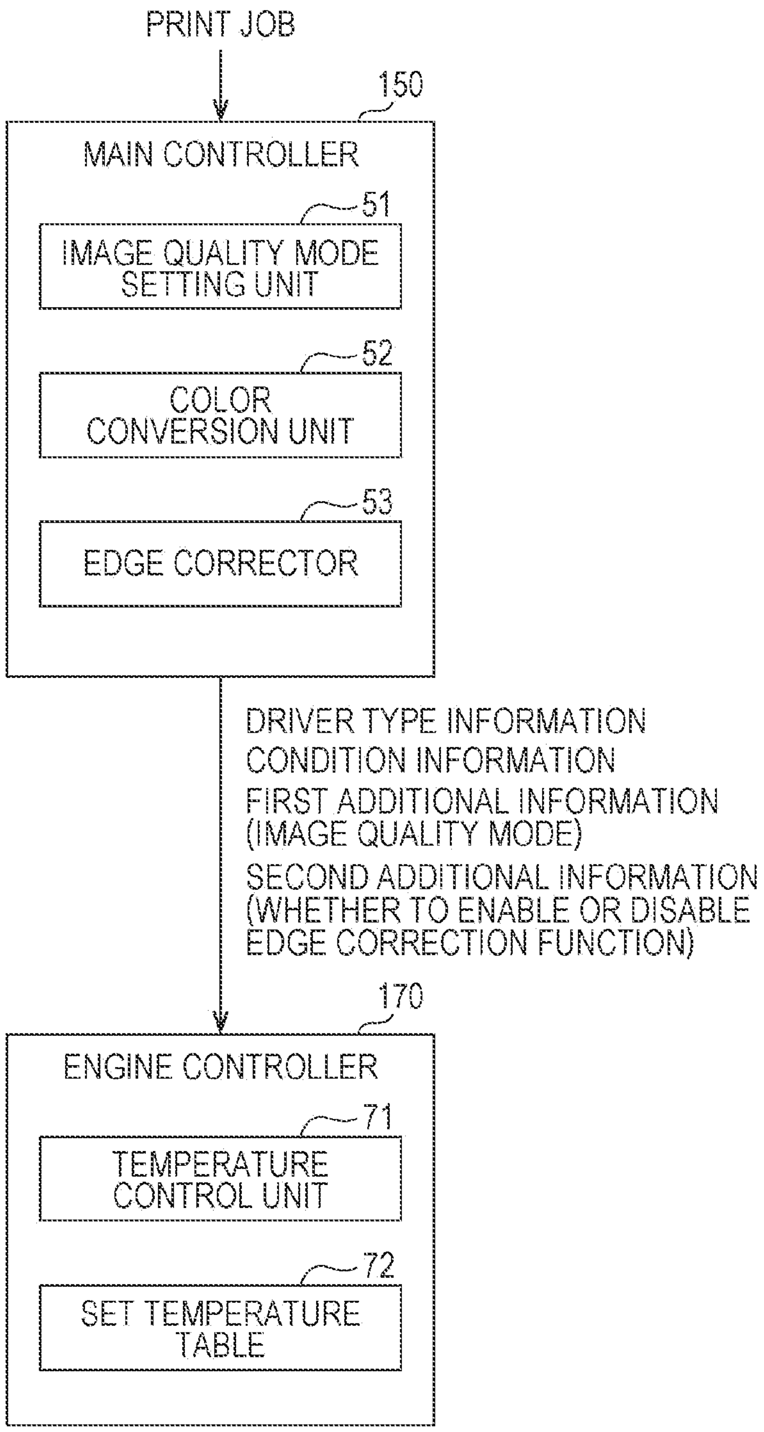
FIG. 4 is a diagram illustrating functional configurations of a main controller and an engine controller.

FIG. 4 is a diagram illustrating functional configurations of a main controller and an engine controller. As illustrated in FIG. 4, the main controller 150 includes an image quality mode setting unit 51, a color conversion unit 52, and an edge corrector 53.

The image quality mode setting unit 51 sets an image quality mode for a print job generated using a PS printer driver based on an operation on the operation panel 130. In the present embodiment, the user can select one of a normal mode or a designer mode as the image quality mode. The designer mode has higher image quality than the normal mode. The image quality mode setting unit 51 sets the normal mode as an image quality mode for a print job generated using a PCL printer driver.

The color conversion unit 52 color-converts the image data included in the print job received from the client terminal 200 into image data indicating CMYK density.

The color indicated by the image data included in the print job varies depending on the type of the printer driver 300 and the type of the application 400 in which the image data is created.

For example, the image generated by Excel (registered trademark) manufactured by Microsoft Corporation, which is spreadsheet software, indicates RGB density. In a case where the image is to be printed, the printer driver 300 generates a print job including the following image data. That is, the PCL printer driver generates image data indicating the RGB density. The PS printer driver generates image data indicating Lab density regardless of the image quality mode set in the image forming apparatus 100.

The image generated by Photoshop (registered trademark) manufactured by Adobe Systems Inc., which is image editing software, indicates the YMCK density. In a case where the image is to be printed, the printer driver 300 generates a print job including the following image data. That is, the PCL printer driver generates image data indicating the RGB density. In a case where the normal mode is set in the image forming apparatus 100, the PS printer driver generates image data indicating the Lab density. In a case where the designer mode is set in the image forming apparatus 100, the PS printer driver generates image data indicating the YMCK density.

The color conversion unit 52 may perform color conversion processing based on the color indicated by the image data included in the print job. When the designer mode is set, the image data generated by the PS printer driver indicates the YMCK density. In this case, the color conversion unit 52 adjusts the YMCK density so as to obtain an amount of toner suitable for the print engine 110.

The edge corrector 53 performs processing (edge correction) of adjusting the density of edges in an image. The operation panel 130 receives whether to enable or disable an edge correction function. The edge corrector 53 performs edge correction only in a case where the edge correction function is set to be enabled.

Figure 5:
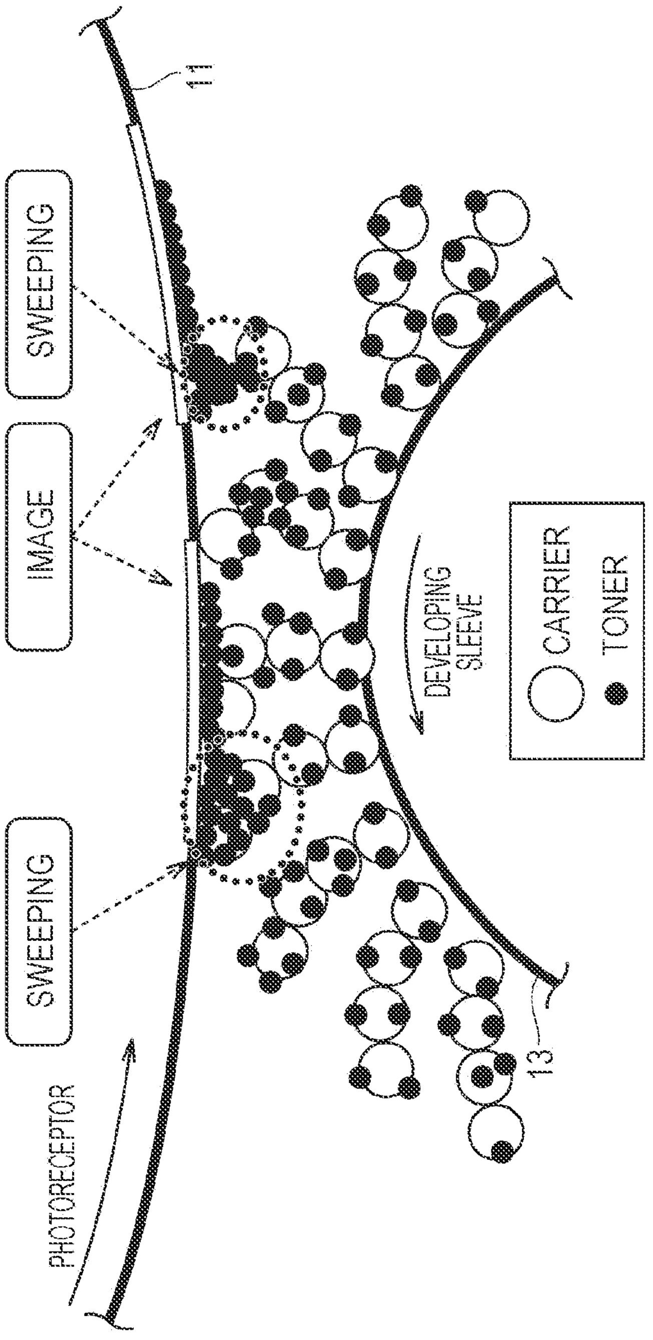
FIG. 5 is a diagram illustrating a state where a toner image is formed on a surface of a photoreceptor.

FIG. 5 is a diagram illustrating a state where a toner image is formed on a surface of a photoreceptor. FIG. 5 illustrates a counter developing method. In the counter developing method, by the photoreceptor 11 and a developing sleeve 13 rotating in the opposite direction, the toner at the edge at the head in the rotation direction of the photoreceptor 11 is swept to the rear side by the brush of the carrier. Therefore, the toner density at the edge at the head in the rotation direction of the photoreceptor 11 decreases. On the other hand, the toner density at the edge at the trail in the rotation direction of the photoreceptor 11 increases.

In addition, the edge effect in which a large amount of toner adheres to an edge of an image and less amount of toner adheres to a central portion is known in toner development. The edge effect remarkably appears particularly in a solid portion with a large area. This is because the lines of electric force of an electrostatic latent image on the photoreceptor are concentrated on the edge, and thus the toner is concentrated on the edge.

The edge corrector 53 corrects the image data so as to solve such a problem about the toner density of the edge.

Figures 6, 7:
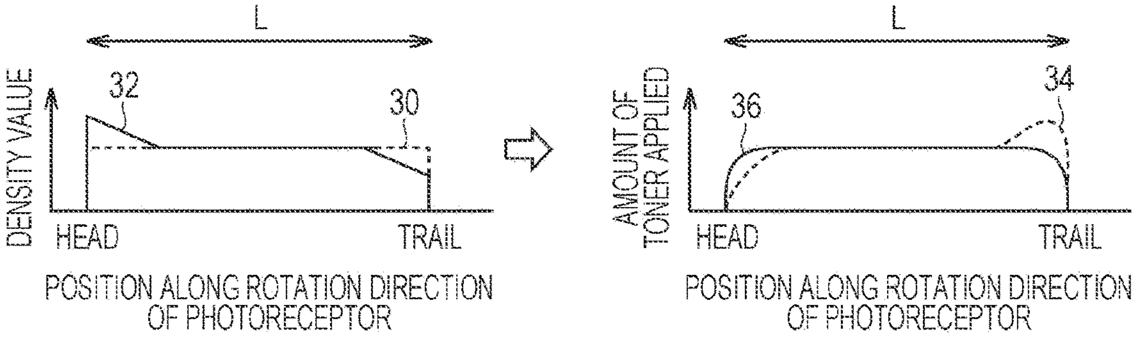
FIG. 6 is a diagram for explaining edge correction.
FIG. 7 is a diagram illustrating an example of a set temperature table.

FIG. 6 is a diagram for explaining edge correction. The left side of FIG. 6 shows a change in a density value indicated by image data along the rotation direction of the photoreceptor. The right side of FIG. 6 shows a change in the amount of toner applied along the rotation direction of the photoreceptor.

A broken line 30 indicates a change in the density value when the edge correction function is disabled. A broken line 34 indicates a change in the amount of toner applied when the edge correction function is disabled. As indicated by the broken line 30, the image data indicates a constant density value in an area where a toner image is formed. However, since the toner is swept as illustrated in FIG. 5, as indicated by the broken line 34, the amount of toner applied at the edge at the head in the rotation direction of the photoreceptor decreases, and the amount of toner applied at the edge at the tail in the rotation direction increases.

The edge correction unit 53 corrects the image data as indicated by a solid line 32 so as to suppress the influence of toner sweeping. That is, the edge correction unit 53 increases the density value of the edge at the head in the rotation direction of the photoreceptor and decreases the density value of the edge at the trail in the rotation direction of the photoreceptor. As a result, as indicated by a solid line 36, the fluctuation in the amount of toner applied due to toner sweeping is suppressed.

Toner sweeping by the brush of the carrier and the edge effect are less likely to occur as a length L of the area where the toner image is formed along the rotation direction of the photoreceptor is shorter. Therefore, the edge correction unit 53 does not need to perform edge correction when the length L is less than a reference value, and may perform edge correction when the length L is larger than or equal to the reference value. Furthermore, the edge correction unit 53 may change the intensity of edge correction depending on the length L. As the intensity of edge correction increases, the amount of change of the solid line 32 with respect to the broken line 30 illustrated in FIG. 6 increases. For example, assuming that the intensity of edge correction when the length L is larger than or equal to 1.69 mm is 100, the edge correction unit 53 sets the intensity of edge correction when the length L is 1.35 mm to 1.69 mm to 60, the intensity of edge correction when the length L is 0.68 mm to 1.02 mm to 40, and the intensity of edge correction when the length L is less than 0.68 mm to 0.

In a text (character) area in the image, the length L of the area where the toner image is formed is short. Therefore, in the text area, toner sweeping by the brush of the carrier and the edge effect are less likely to occur. Therefore, in a case where the edge correction function is enabled, the edge correction unit 53 may determine whether to perform edge correction for each area in the image. Specifically, the edge correction unit 53 determines the attribute of each pixel in the image, and classifies the image into a text area, a graphic (chart) area, and an image (picture or photograph) area. The edge correction unit 53 does not perform edge correction on the text area but performs edge correction on the graphic area and the image area.

The main controller 150 outputs image data obtained by the processing performed by the color conversion unit 52 and the edge correction unit 53 to the engine controller 170. The main controller 150 also outputs driver type information and condition information included in the print job to the engine controller 170. Furthermore, the main controller 150 outputs, to the engine controller 170, first additional information indicating the image quality mode set by the image quality mode setting unit 51, and second additional information indicating whether the edge correction function is enabled or disabled.

The engine controller 170 controls the operation of the print engine 110 based on the image data received from the main controller 150. As illustrated in FIG. 4, the engine controller 170 includes a temperature control unit 71 and a set temperature table 72.

The temperature control unit 71 changes the set temperature of the fixing device 116 depending on the type of the printer driver 300 that has generated the print job.

The PCL printer driver generates image data with less combination of gradations of each color. Therefore, when printing is performed based on the image data generated by the PCL printer driver, the toner of YMCK hardly overlaps. As a result, the amount of toner applied on the sheet S is also small.

The PS printer driver generates image data with many combinations of gradations of each color. Therefore, when printing is performed based on the image data generated by the PS printer driver, the YMCK toner overlaps. As a result, the amount of toner applied on the sheet S is also large. In particular, in a case where the designer mode is set as the image quality mode, the amount of toner applied on the sheet S further increases in order to obtain a high-quality image.

As the amount of toner applied increases, the amount of heat required for fixing the toner image onto the sheet S also increases. Therefore, the temperature control unit 71 increases the set temperature of the fixing device 116 in a case where the printer driver 300 that has generated the print job is the PS printer driver, as compared with the case where the printer driver 300 that has generated the print job is the PCL printer driver.

Furthermore, in a case where the printer driver 300 that has generated the print job is the PS printer driver, the temperature control unit 71 may change the set temperature of the fixing device 116 depending on the image quality mode. Specifically, the temperature control unit 71 increases the set temperature of the fixing device 116 in a case where the image quality mode is the designer mode as compared with a case where the image quality mode is the normal mode.

In a case where the edge correction function is disabled, as indicated by the broken line 34 in FIG. 6, the amount of toner applied at the edge at the trail in the rotation direction of the photoreceptor increases due to toner sweeping by the brush of the carrier. Therefore, the temperature control unit 71 may increase the set temperature of the fixing device 116 in a case where edge correction is not performed as compared with a case where edge correction is performed.

Moreover, the temperature control unit 71 may change the set temperature of the fixing device 116 depending on the type of the sheet S. The type of the sheet S is defined by basis weight, thickness, or the like. For example, the heat capacity of cardboard is larger than the heat capacity of plain paper. Therefore, the temperature control unit 71 increases the set temperature of the fixing device 116 in a case where the sheet S is cardboard as compared with a case where the sheet S is plain paper.

Specifically, the temperature control unit 71 refers to the set temperature table 72 and changes the set temperature of the fixing device 116.

FIG. 7 is a diagram illustrating an example of a set temperature table. As illustrated in FIG. 7, the set temperature table 72 associates the type of the printer driver 300, the image quality mode, the state of the edge correction function, the type of the sheet S, and the set temperature of the fixing device 116. The set temperature table 72 illustrated in FIG. 7 is created in advance based on the specification of the print engine 110.

The temperature control unit 71 specifies the type of the printer driver 300 that has generated the print job on the basis of the driver type information. Furthermore, in a case where the type of the printer driver 300 is the PS printer driver, the temperature control unit 71 specifies the image quality mode set by the image quality mode setting unit 51 on the basis of the first additional information received from the main controller 150. The temperature control unit 71 specifies whether the edge correction function is enabled or disabled on the basis of the second additional information received from the main controller 150. The temperature control unit 71 specifies the type of the sheet S on the basis of the condition information.

The temperature control unit 71 reads the specified type of the printer driver 300, the image quality mode, the state of the edge correction function, and the set temperature corresponding to the type of the sheet S from the set temperature table 72. The temperature control unit 71 controls the fixing device 116 to have the read set temperature.

In the monochrome print mode, the amount of toner applied on the sheet S is small regardless of the type of the printer driver 300. Therefore, the temperature control unit 71 does not change the set temperature in the monochrome print mode, and changes the set temperature in the color print mode. Specifically, the temperature control unit 71 sets the set temperature of the fixing device 116 to a default temperature (for example, a temperature of 160° C. or lower) in the monochrome print mode. The temperature control unit 71 changes the set temperature of the fixing device 116 in accordance with the set temperature table 72 in the color print mode.

(D. Processing Flow of Image Forming Apparatus)

Figure 8:
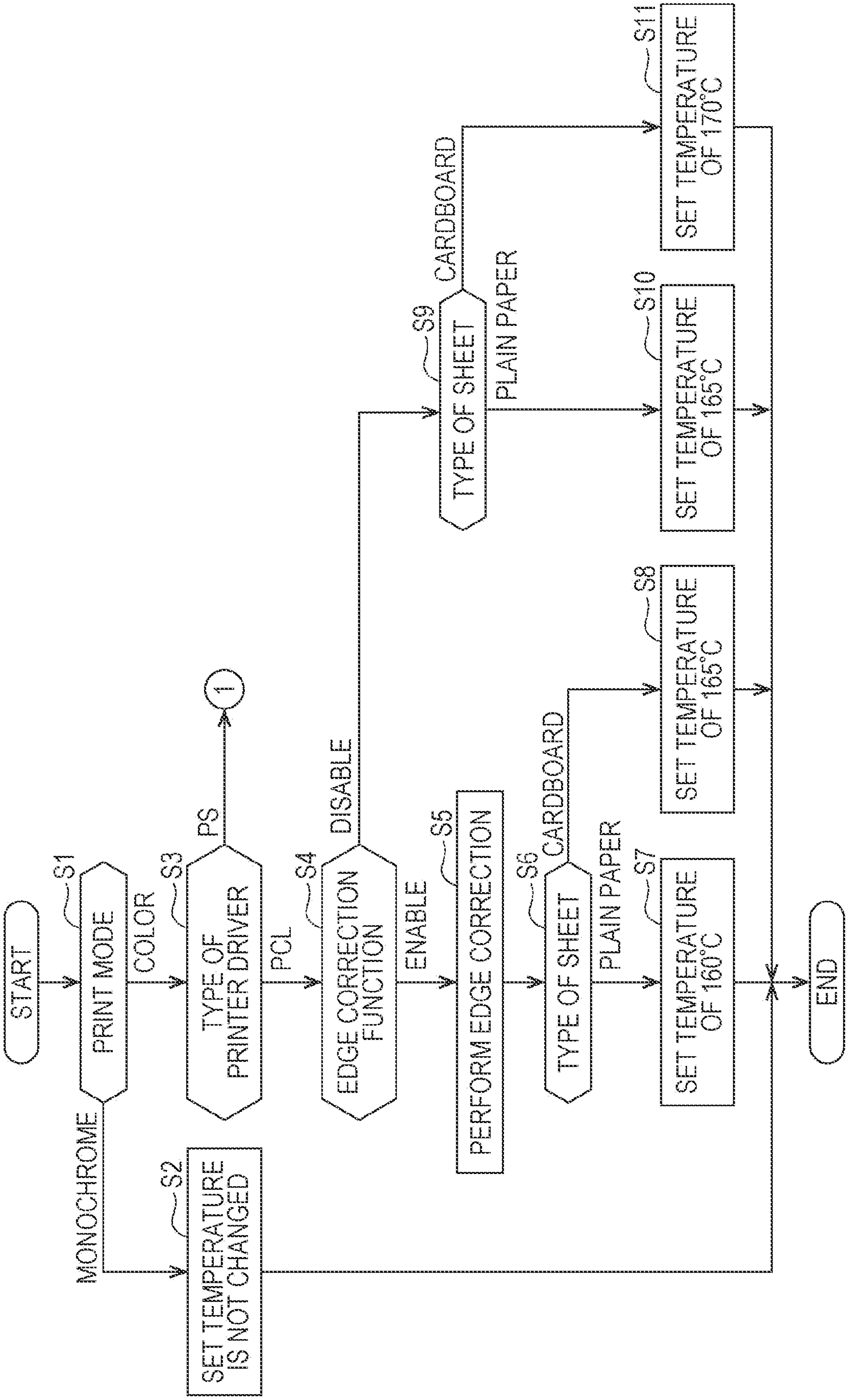
FIG. 8 is a flowchart illustrating a part of a processing flow of the image forming apparatus.
Figure 9:
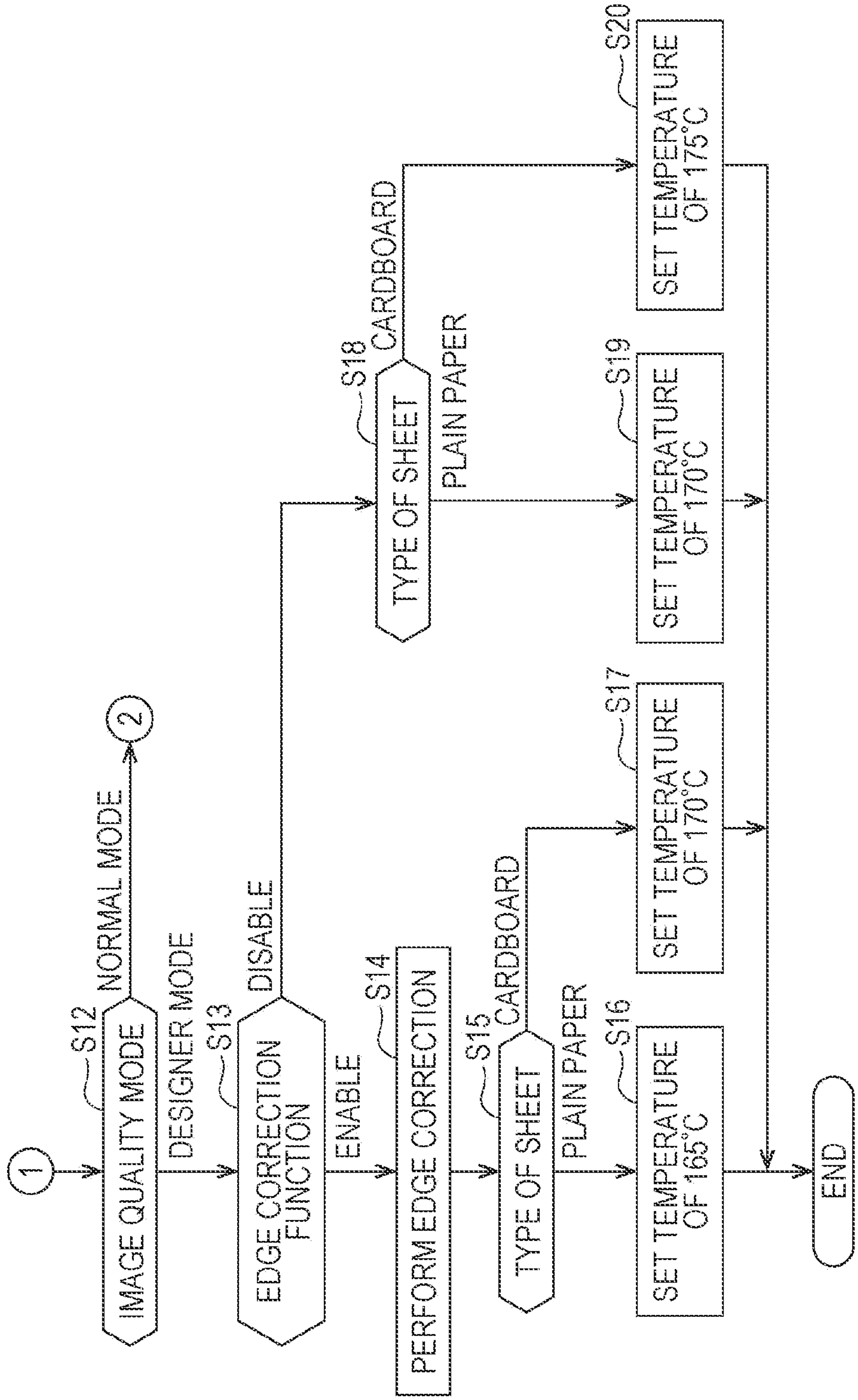
FIG. 9 is a flowchart illustrating another part of the processing flow of the image forming apparatus.
Figure 10:
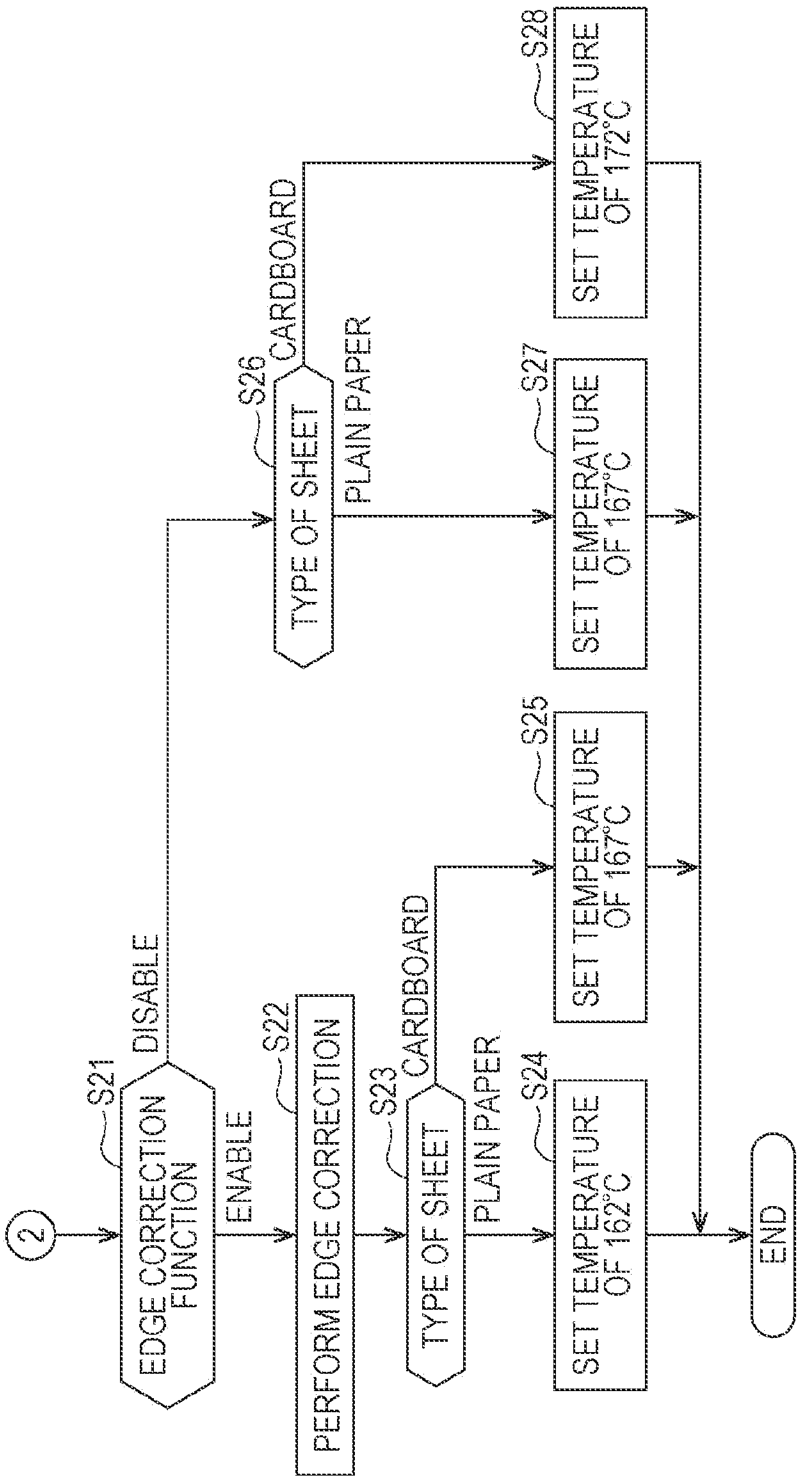
FIG. 10 is a flowchart illustrating yet another part of the processing flow of the image forming apparatus.

An example of a processing flow of the image forming apparatus 100 will be described with reference to FIGS. 8 to 10. FIG. 8 is a flowchart illustrating a part of a processing flow of the image forming apparatus 100. FIG. 9 is a flowchart illustrating another part of the processing flow of the image forming apparatus 100. FIG. 10 is a flowchart illustrating yet another part of the processing flow of the image forming apparatus 100. The processing illustrated in FIGS. 8 to 10 is performed each time a print job is received from the client terminal 200.

As illustrated in FIG. 8, the image forming apparatus 100 determines a print mode (a color mode or a monochrome mode) (step S1). The print mode is determined based on a print condition included in the print job or an operation on the operation panel 130.

If the print mode is the monochrome print mode, the image forming apparatus 100 does not change the set temperature of the fixing device 116 depending on the type of the printer driver (step S2). That is, the image forming apparatus 100 sets the set temperature of the fixing device 116 to a default temperature (for example, a temperature of 160° C. or lower). The image forming apparatus 100 may change the default temperature on the basis of the type of sheet such as plain paper or cardboard.

If the print mode is the color print mode, the image forming apparatus 100 determines the type of the printer driver 300 that has generated the print job on the basis of the driver type information included in the print job (step S3).

If the determination result in step S3 indicates the PLC printer driver, the image forming apparatus 100 determines whether the edge correction function is enabled or disabled (step S4).

If the determination result in step S4 indicates "enable", the image forming apparatus 100 performs edge correction (step S5). In step S5, edge correction may be performed on all the edges in the image, or edge correction may be performed based on the attribute of an area in the image. For example, edge correction is not performed on a text area, and is performed on a graphic area and an image area.

After step S5, the image forming apparatus 100 determines the type of the sheet S on which an image is to be formed on the basis of the condition information included in the print job (step S6).

If the determination result in step S6 indicates plain paper, the image forming apparatus 100 changes the set temperature of the fixing device 116 to 160° C. in accordance with the set temperature table 72 illustrated in FIG. 7 (step S7).

If the determination result in step S6 indicates cardboard, the image forming apparatus 100 changes the set temperature of the fixing device 116 to 165° C. in accordance with the set temperature table 72 illustrated in FIG. 7 (step S8).

If the determination result in step S4 indicates "disable", the image forming apparatus 100 determines the type of the sheet S on which an image is to be formed on the basis of the condition information included in the print job (step S9).

If the determination result in step S9 indicates plain paper, the image forming apparatus 100 changes the set temperature of the fixing device 116 to 165° C. in accordance with the set temperature table 72 illustrated in FIG. 7 (step S10).

If the determination result in step S9 indicates cardboard, the image forming apparatus 100 changes the set temperature of the fixing device 116 to 170° C. in accordance with the set temperature table 72 illustrated in FIG. 7 (step S11).

If the determination result in step S3 indicates the PS printer driver, as illustrated in FIG. 9, the image forming apparatus 100 determines the image quality mode (step S12).

If the determination result in step S12 indicates the designer mode, the image forming apparatus 100 determines whether the edge correction function is enabled or disabled (step S13).

If the determination result in step S13 indicates "enable", the image forming apparatus 100 performs edge correction (step S14). Details of step S14 are similar to those of step S5.

After step S14, the image forming apparatus 100 determines the type of the sheet S on which an image is to be formed on the basis of the condition information included in the print job (step S15).

If the determination result in step S15 indicates plain paper, the image forming apparatus 100 changes the set temperature of the fixing device 116 to 165° C. in accordance with the set temperature table 72 illustrated in FIG. 7 (step S16).

If the determination result in step S15 indicates cardboard, the image forming apparatus 100 changes the set temperature of the fixing device 116 to 170° C. in accordance with the set temperature table 72 illustrated in FIG. 7 (step S17).

If the determination result in step S13 indicates "disable", the image forming apparatus 100 determines the type of the sheet S on which an image is to be formed on the basis of the condition information included in the print job (step S18).

If the determination result in step S18 indicates plain paper, the image forming apparatus 100 changes the set temperature of the fixing device 116 to 170° C. in accordance with the set temperature table 72 illustrated in FIG. 7 (step S19).

If the determination result in step S18 indicates cardboard, the image forming apparatus 100 changes the set temperature of the fixing device 116 to 175° C. in accordance with the set temperature table 72 illustrated in FIG. 7 (step S20).

If the determination result in step S12 indicates the normal mode, as illustrated in FIG. 10, the image forming apparatus 100 determines whether the edge correction function is enabled or disabled (step S21).

If the determination result in step S21 indicates "enable", the image forming apparatus 100 performs edge correction (step S22). Details of step S22 are similar to those of step S5.

After step S22, the image forming apparatus 100 determines the type of the sheet S on which an image is to be formed on the basis of the condition information included in the print job (step S23).

If the determination result in step S23 indicates plain paper, the image forming apparatus 100 changes the set temperature of the fixing device 116 to 162° C. in accordance with the set temperature table 72 illustrated in FIG. 7 (step S24).

If the determination result in step S23 indicates cardboard, the image forming apparatus 100 changes the set temperature of the fixing device 116 to 167° C. in accordance with the set temperature table 72 illustrated in FIG. 7 (step S25).

If the determination result in step S21 indicates "disable", the image forming apparatus 100 determines the type of the sheet S on which an image is to be formed on the basis of the condition information included in the print job (step S26).

If the determination result in step S26 indicates plain paper, the image forming apparatus 100 changes the set temperature of the fixing device 116 to 167° C. in accordance with the set temperature table 72 illustrated in FIG. 7 (step S27).

If the determination result in step S26 indicates cardboard, the image forming apparatus 100 changes the set temperature of the fixing device 116 to 172° C. in accordance with the set temperature table 72 illustrated in FIG. 7 (step S28).

(E. Modifications)

The temperature control unit 71 of the engine controller 170 may change the set temperature of the fixing device 116 based on at least one of the conveyance speed of the sheet S, the external environment, or the operation state of the image forming apparatus 100 in addition to the type of the printer driver.

As the conveyance speed of the sheet S increases, the amount of heat transmitted from the fixing device 116 to the sheet S per unit time decreases. Therefore, the temperature control unit 71 preferably increases the set temperature of the fixing device 116 as the conveyance speed of the sheet S increases.

As the outside air temperature, which is one of the external environments, increases, the amount of heat required for fixing the toner image on the sheet S decreases. Therefore, the temperature control unit 71 preferably lowers the set temperature of the fixing device 116 as the outside air temperature increases.

Since the moisture content of the sheet S increases as the outside air humidity, which is one of the external environments, increases, the sheet S is easily curled after passing through the fixing device 116. Therefore, the temperature control unit 71 preferably lowers the set temperature of the fixing device 116 as the outside air humidity increases.

In a case where the image forming apparatus 100 has a sleep mode in which power supply to each unit is stopped or minimized for energy saving, the temperature control unit 71 may change the set temperature of the fixing device 116 based on whether or not the operating state of the image forming apparatus 100 is immediately after recovery from the sleep mode. During the sleep mode, power supply to the fixing device 116 is suppressed, and the temperature of the fixing device 116 is lowered. Therefore, in a case where the operating state of the image forming apparatus 100 is immediately after returning from the sleep mode, the temperature control unit 71 preferably increases the set temperature of the fixing device 116.

(F. Appendix) As described above, the present embodiment includes the following disclosure.

(First Configuration)

An image forming apparatus including:

a fixing device that thermally fixes an image based on a print job onto a sheet S; and a control unit (temperature control unit 71) that changes a set temperature of the fixing device depending on a type of a printer driver that has generated the print job.

(Second Configuration)

The image forming apparatus according to the first configuration, wherein the control unit changes the set temperature in a color print mode, and does not change the set temperature in a monochrome print mode.

(Third Configuration)

The image forming apparatus according to the first or second configuration, wherein the control unit changes the set temperature depending on an image quality mode, in addition to a type of the printer driver.

(Fourth Configuration)

The image forming apparatus according to any one of the first to third configurations further including a correction unit that performs edge correction for adjusting a density of an edge in an image, wherein the control unit changes the set temperature based on whether or not the edge correction is performed by the correction unit in addition to a type of the printer driver.

(Fifth Configuration)

The image forming apparatus according to any one of the first to fourth configurations, wherein the control unit changes the set temperature based on at least one of a type of the sheet, a conveyance speed of the sheet, an external environment, or an operating state of the image forming apparatus, in addition to a type of the printer driver.

(Sixth Configuration)

A method of controlling a fixing device that thermally fixes an image based on a print job onto a sheet, the method including:

determining a type of a printer driver that has generated the print job; and changing a set temperature of the fixing device depending on the type of the printer driver determined.

(Seventh Configuration)

The control method according to the sixth configuration, wherein the changing is performed in a color print mode and is not performed in a monochrome print mode.

(Eighth Configuration)

The control method according to the sixth or seventh configuration, wherein the changing includes changing the set temperature depending on an image quality mode, in addition to a type of the printer driver.

(Ninth Configuration)

The control method according to any one of the sixth to eighth configurations further including performing edge correction for adjusting a density of an edge in an image, wherein the changing includes changing the set temperature based on whether or not the edge correction is performed in addition to a type of the printer driver.

(Tenth Configuration)

The control method according to any one of the sixth to tenth configurations, wherein the changing includes changing the set temperature based on at least one of a type of the sheet, a conveyance speed of the sheet, an external environment, or an operating state of the image forming apparatus, in addition to a type of the printer driver.

According to an embodiment of the present disclosure, it is possible to suppress the occurrence of a fixing failure while suppressing the decrease in productivity.

Although embodiments of the present invention have been described and illustrated in detail, the disclosed embodiments are made for purposes of illustration and example only and not limitation. The scope of the present invention should be interpreted by terms of the appended claims, and it is intended that meanings equivalent to the claims and all modifications within the scope are included.

What is claimed is:

1. An image forming apparatus comprising:

a fixing device that thermally fixes an image based on a print job onto a sheet; and a hardware processor that changes a set temperature of the fixing device depending on a type of a printer driver that has generated the print job.

2. The image forming apparatus according to claim 1, wherein the hardware processor changes the set temperature in a color print mode, and does not change the set temperature in a monochrome print mode.

3. The image forming apparatus according to claim 1, wherein the hardware processor changes the set temperature depending on an image quality mode, in addition to a type of the printer driver.

4. The image forming apparatus according to claim 1 further comprising a corrector that performs edge correction for adjusting a density of an edge in an image, wherein the hardware processor changes the set temperature based on whether or not the edge correction is performed by the corrector in addition to a type of the printer driver.

5. The image forming apparatus according to claim 1, wherein the hardware processor changes the set temperature based on at least one of a type of the sheet, a conveyance speed of the sheet, an external environment, or an operating state of the image forming apparatus, in addition to a type of the printer driver.

6. A method of controlling a fixing device that thermally fixes an image based on a print job onto a sheet, the method comprising:

determining a type of a printer driver that has generated the print job; and changing a set temperature of the fixing device depending on the type of the printer driver determined.

* * * * *